United States Patent [19]

Huang

[11] Patent Number: 5,320,137

[45] Date of Patent: Jun. 14, 1994

[54] FAUCET WITH LIQUID CRYSTAL TEMPERATURE INDICATOR

[76] Inventor: Chien-Ta Huang, No. 41, Cherz Road, Hsin Tien, Taipei, Taiwan

[21] Appl. No.: 109,633

[22] Filed: Aug. 20, 1993

[30] Foreign Application Priority Data

Jan. 11, 1993 [CN] China ................................ 93201693

[51] Int. Cl.[5] ............................................. F16K 37/00
[52] U.S. Cl. .................................... 137/551; 374/147; 374/170
[58] Field of Search ............ 137/551; 236/12.1, 12.16; 374/138, 141, 147, 148, 170

[56] References Cited

U.S. PATENT DOCUMENTS

| 899,201 | 9/1908 | Braybrook | 374/147 X |
|---|---|---|---|
| 4,458,839 | 7/1984 | MacDonald | 236/12.16 |
| 4,509,550 | 4/1985 | Monk | 137/551 |
| 4,575,262 | 3/1986 | Andersen | 137/551 X |
| 4,682,626 | 7/1987 | Bergmann | 137/551 |
| 4,700,885 | 10/1987 | Knebel | 236/12.16 |
| 4,968,152 | 11/1990 | Bergmann | 137/551 X |
| 5,137,051 | 8/1992 | Laur et al. | 137/551 |

Primary Examiner—John Rivell
Attorney, Agent, or Firm—Bucknam and Archer

[57] ABSTRACT

A faucet which having a spout, a handle, a middle cover, a temperature indicator and a top cover. A thermometer is installed in the hole of the strut of the middle cover for detecting the temperature of tap water which would be shown in the indicating window immediately.

1 Claim, 7 Drawing Sheets

FAUCET WITH LIQUID CRYSTAL TEMPERATURE INDICATOR

BACKGROUND OF THE INVENTION

Tap water plays an important role in our daily life, which is an essential to comfortable living conditions. Therefore, the universality of tap water as well as electricity are the main indexes to a civilized society.

Faucets, where the tap water usually runs from, has been improved over and over for the convenience of tap water using. With regard the newest type of faucet with a single faucet hole, the temperature of water can be selected by the user by adjusting handle directly, which would eliminate the inconvenience of adjusting temperature on two different handles.

However, the biggest problem of this type of faucet is that we can not know the temperature of water. The most convenient but not precise way to know the temperature of water is to feel it through the sense of touch of our skin, but the possibility of being scalded with hot water comes. Everybody has their own feel of hot, a certain temperature might be appropriate to an adult, but might be too hot for a child. Moreover, until you realize that the temperature is not what you want, the water would have already been too much. For adjusting the water temperature, more water would be run from the faucet. This not only wastes the water but also wastes the energy.

In view of the above-mentioned disadvantages, the applicant of the present invention had been devoting himself to developing the faucet with liquid crystal temperature indicator of the present invention for many years. After researching over and over again, the present invention has finally been developed.

SUMMARY OF THE INVENTION

The present invention relates to a faucet with liquid crystal temperature indicator, and more particularly to a faucet with a spout, a handle, a middle cover, a temperature indicator and a top cover. The present invention has the features as follows:

The faucet has a hole opened in the top of handle, a hole in the center of cover ring of middle cover for inserting a strut, a transparent top cover scarf jointed to the middle cover and the strut penetrated the hole in the top of handle and is screwed to the faucet hole so that the thermometer can detect the real water temperature and show it in the temperature indicating window.

DETAILED DESCRIPTION OF THE PREFERRED EMBODIMENTS

Figure 1:
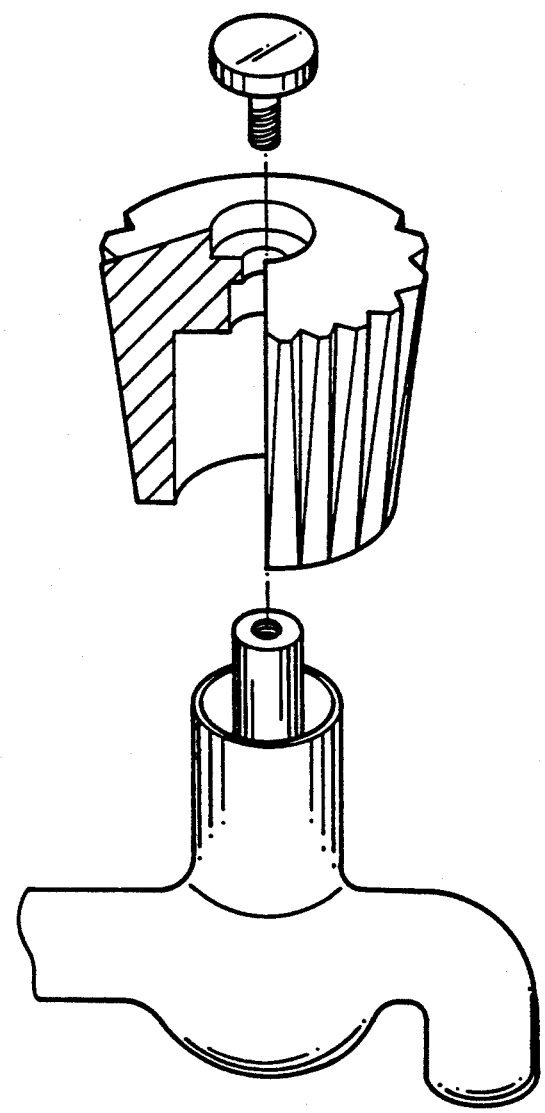
FIG. 1 is an exploded view of a faucet according to the prior art.
Figures 2, 2A:
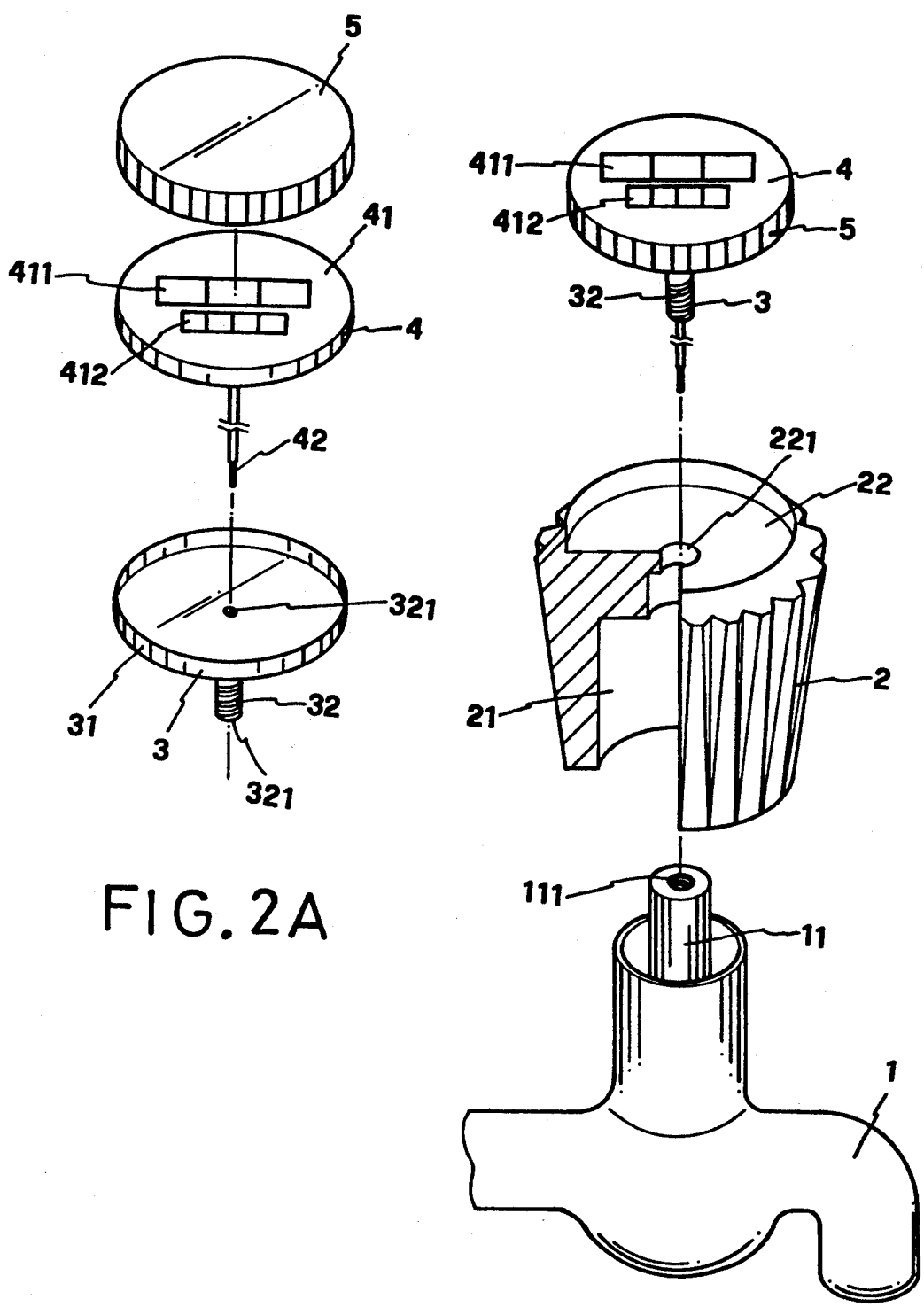
FIG. 2 is a three-dimensional exploded view of the present invention.
FIG. 2A is an exploded view of the middle cover and temperature indicator of FIG. 2.
Figure 3:
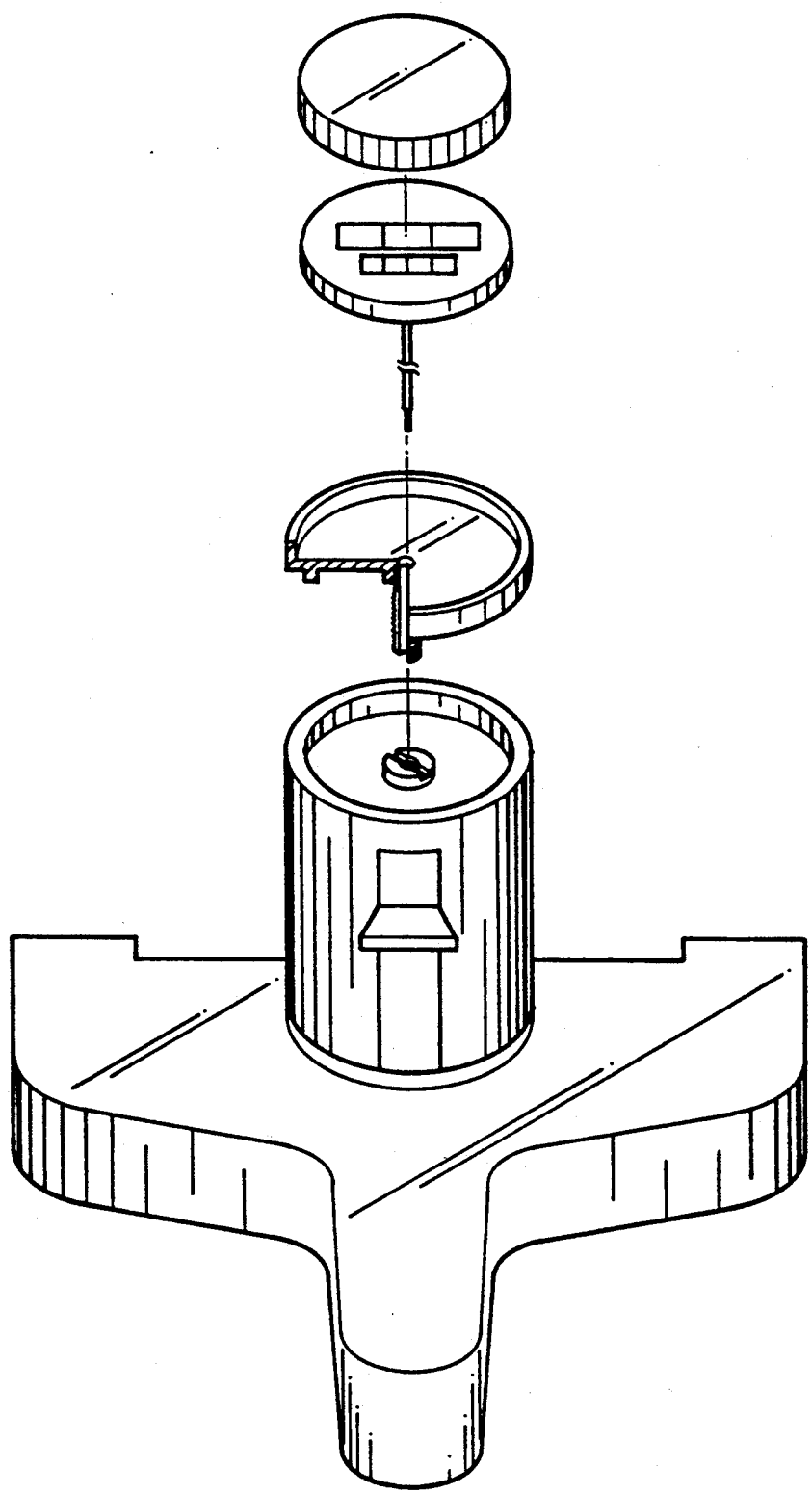
FIGS. 3, 4 and 5 are applied schematics of different faucets of the present invention.
Figure 4:
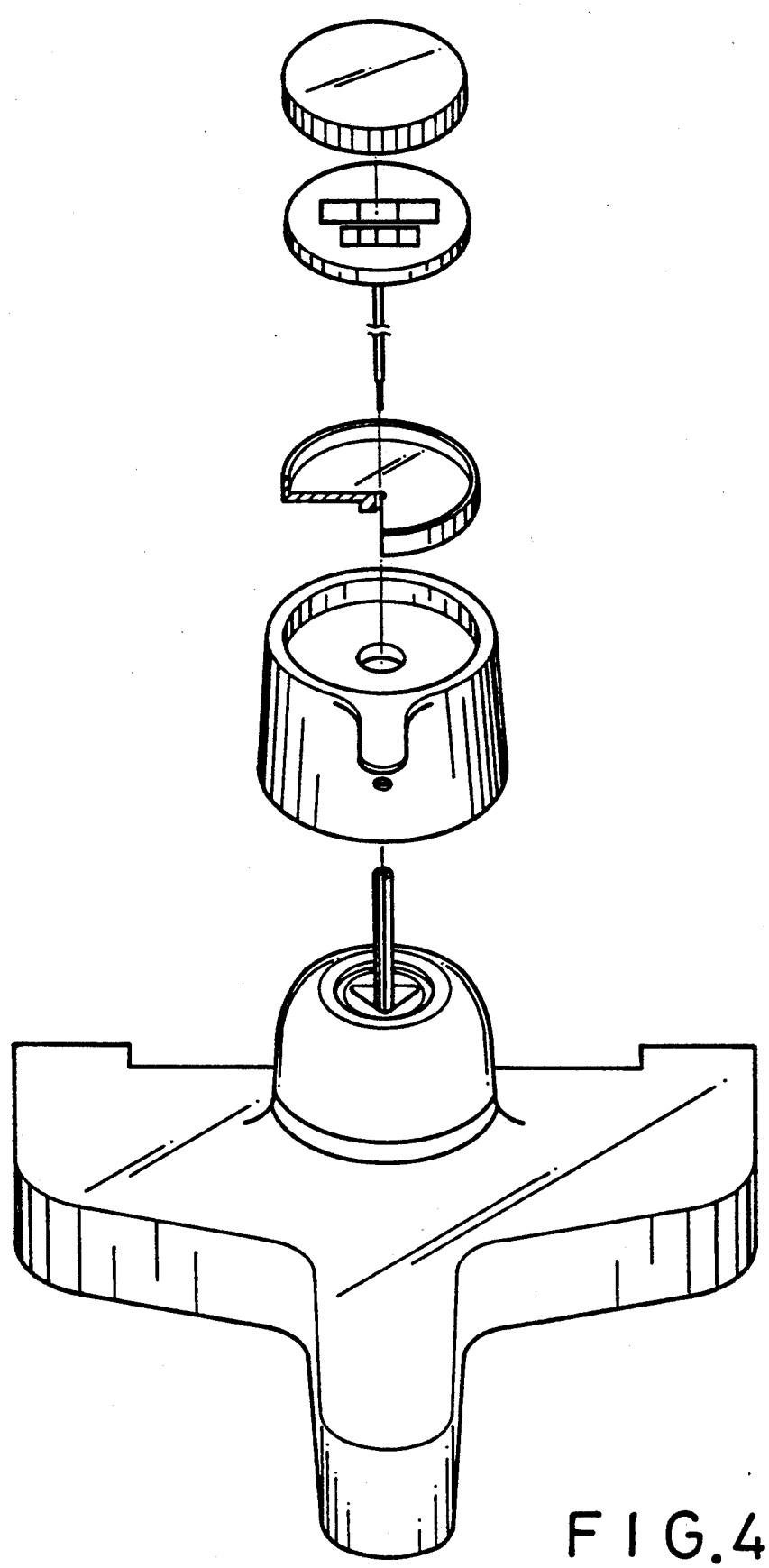
Figures 5, 5A:
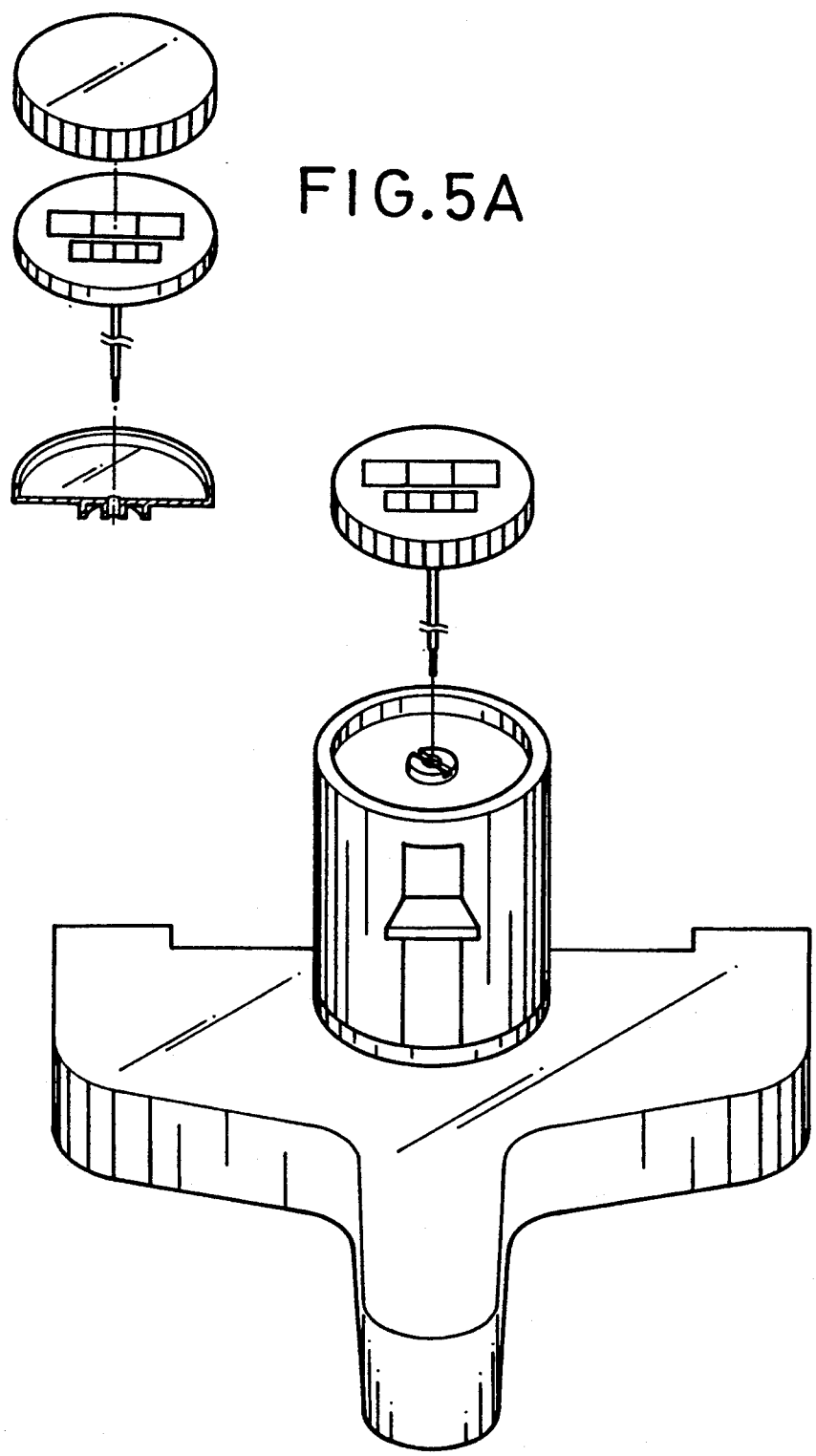
FIG. 5A is an exploded view of the middle cover and temperature indicator of FIG. 5.
Figure 6:
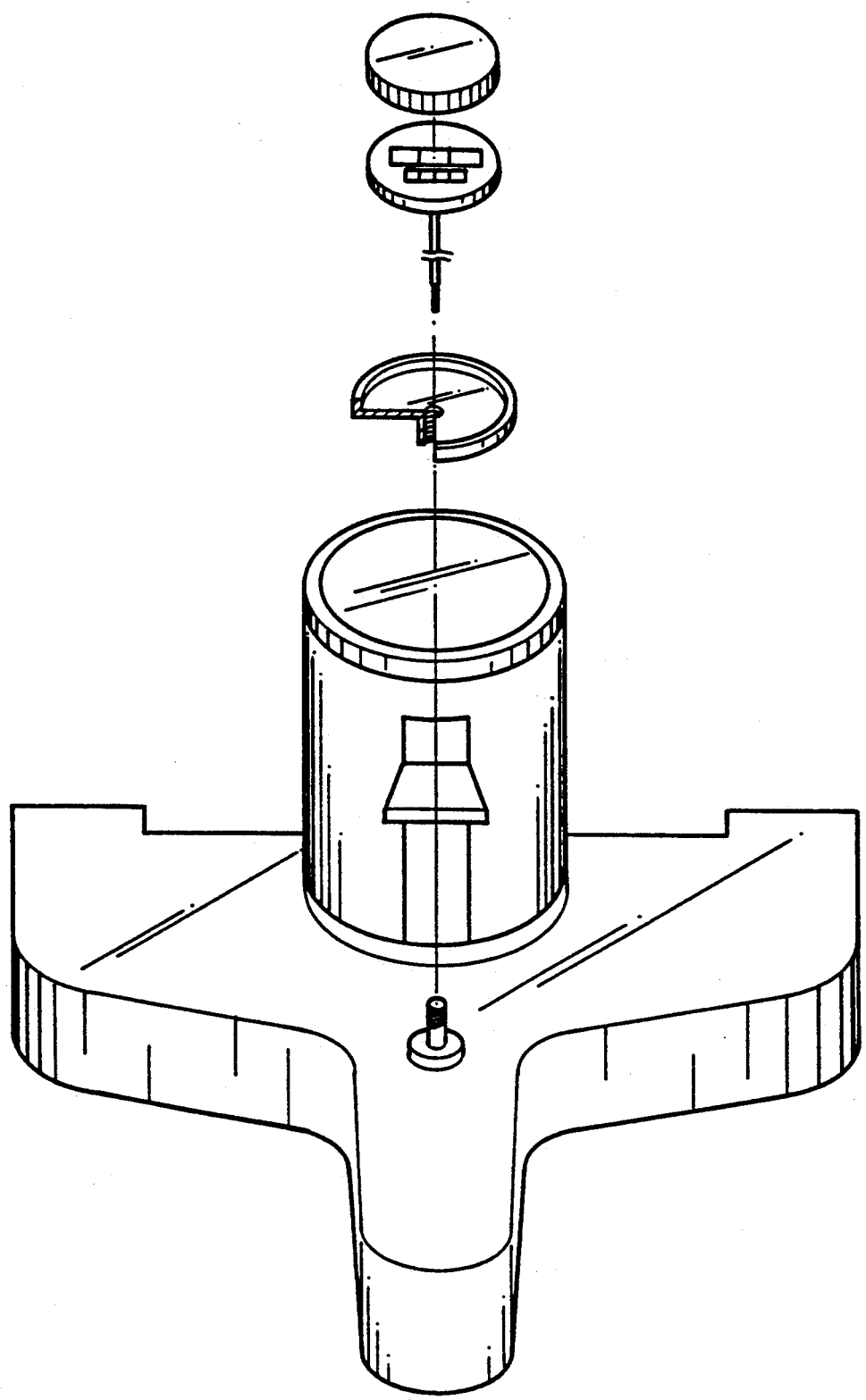
FIGS. 6 and 7 are schematics of different faucets apply the present invention in different positions.
Figure 7:
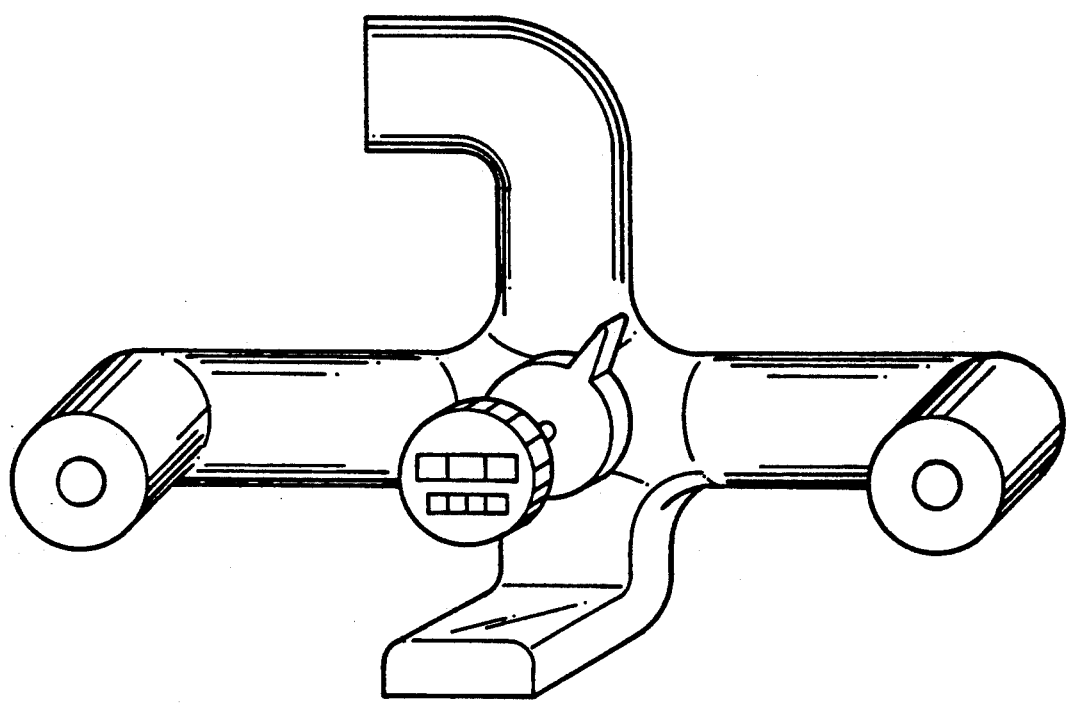

Referring to Figures, the faucet with liquid crystal temperature indicator of the present invention basically consists of a spout 1, a handle 2, a middle cover 3, a temperature indicator 4 and a top cover 5.

Said spout 1, the prior art unit of the faucet, has valves inside, a control rod 11 extended upward, a water hole 111 installed in the center of said control rod 11 for detecting the water temperature, and a thread in the inside wall of said water hole for screwing on the middle cover 3.

The handle 2, also the prior art unit of the faucet, has undulate streaks in the outside wall for the convenience of turning, a hole 21 in the bottom inside for installing the top of said spout 1, the top wall 22 corresponds to water hole 111 and a top hole 221 for connecting with middle cover 3.

The middle cover 3 has a cover ring 31, a cover strut 32 with a thread extending from the center. The cover strut 32 has a hole 321 in the center. (The hole can not be shown completely in the figure owing to the angle of projection)

The temperature indicator 4 has an indicating plate 41, a thermometer 42 downwardly extending from the center, the indicating plate has an indicating window 411, a condensing plate 412 installed in the surface, batteries installed inside. Therefore, as soon as the thermometer 42 detects the temperature, the figure would be shown in the indicating window 411 immediately.

Said top cover 5 is a transparent cover whose dimension should fit with which of said middle cover 3 for jointing to each other.

Therefore, after the assembly, said temperature indicator 4 is inlaid in the middle cover 3, the thermometer 42 is inserted into said strut hole 321, the top cover 5 is scarf jointed to the middle cover and the cover strut 32 crosses the top hole 221 of the handle 2 and screws on the water hole 111.

When tap water runs through the spout 1, the thermometer 41 detects the real water temperature and show it immediately in the indicating window 411 so as to eliminate the aforesaid disadvantage of detecting water temperature by skin.

The invention is described in detail in connection with the preferred embodiment but also is an example only and this invention is not restricted thereto. It will be easily understood by those skills in the art that other variations and modifications can be easily made within the scope of this invention.

What is claimed is

1. A faucet with liquid crystal temperature indicator comprising:
   a) a water spout having a valve therein for water flow adjustment;
   b) a control rod extending from said water spout for controlling the valve of said water spout, said control rod having a centrally disposed threaded opening therein;
   c) a handle adapted for attachment to said control rod and having a top wall with a centrally arranged opening therein aligned with the threaded opening in said control rod;
   d) a middle cover corresponding to the top wall of said handle having a threaded strut arranged to extend through the opening in the top wall of said handle for threaded engagement with the threaded opening in said control rod, said threaded strut including a central opening extending therethrough and through said middle cover;

e) a temperature indicator including an indicator plate arranged on said middle cover, said indicator plate having a liquid crystal display window and a thermometer probe extending therefrom, said probe extending through the central openings of said middle cover and threaded strut and the top wall of said handle and into the opening in said control rod; and f) a transparent top cover covering said middle cover.

* * * * *